(12) United States Patent
Hiraguchi (10) Patent No.: US 6,880,778 B2
(45) Date of Patent: Apr. 19, 2005

(54) RECORDING TAPE CARTRIDGE

(75) Inventor: Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/606,782

(22) Filed: Jun. 27, 2003

(65) Prior Publication Data

US 2004/0026552 A1 Feb. 12, 2004

(30) Foreign Application Priority Data

Jun. 27, 2002 (JP) ........................................ 2002-187260

(51) Int. Cl.⁷ ............................................. G11B 23/107
(52) U.S. Cl. ..................................... 242/348; 360/132
(58) Field of Search ............................. 242/348, 348.2, 242/332.4; 360/132

(56) References Cited

U.S. PATENT DOCUMENTS

| | | | | |
|---|---|---|---|---|
| 3,154,261 A | * | 10/1964 | Breuning ................. | 242/348.2 |
| 5,209,425 A | * | 5/1993 | Krabbenhoft et al. .... | 242/348.2 |
| 6,236,539 B1 | | 5/2001 | Morita et al. | |
| 6,345,779 B1 | * | 2/2002 | Rambosek ............... | 242/348.2 |
| 6,505,789 B1 | * | 1/2003 | Ridl et al. ............... | 242/348.2 |
| 6,598,820 B1 | * | 7/2003 | Morita .................... | 242/348.2 |
| 6,691,941 B1 | * | 2/2004 | Imai ........................ | 242/332.4 |
| 6,695,242 B1 | * | 2/2004 | Aaron et al. ............. | 242/348.2 |
| 6,702,217 B1 | * | 3/2004 | Hiraguchi ................ | 242/348.2 |
| 6,741,423 B1 | * | 5/2004 | Shiga et al. ................ | 360/132 |
| 6,761,327 B1 | * | 7/2004 | Shiga et al. ............. | 242/348.2 |
| 6,769,640 B1 | * | 8/2004 | Schoettle et al. ........ | 242/348.2 |
| 2001/0054664 A1 | * | 12/2001 | Morita .................... | 242/348.2 |

\* cited by examiner

*Primary Examiner*—William A. Rivera
(74) *Attorney, Agent, or Firm*—Sughrue Mion, PLLC (57) ABSTRACT

A recording tape cartridge in which it is possible to reinforce, in a small space, a side wall which is weak in terms of strength due to formation of an opening. The recording tape cartridge has a case which rotatably accommodates a single reel on which a recording tape is wound; an opening, formed in a side wall of the case, for pulling-out of a leader pin attached to an end portion of the recording tape; a pin holding portion holding the leader pin in a vicinity of the opening; an anchor spring holding the leader pin at the pin holding portion by pressing the leader pin by a free end; and a spring holding portion holding a proximal portion of the anchor spring in a vicinity of the pin holding portion. The spring holding portion is formed by ribs which jut out into the case from the side wall; and an anchor portion, the anchor spring being held between the anchor portion and the ribs.

20 Claims, 8 Drawing Sheets

RECORDING TAPE CARTRIDGE

CROSS-REFERENCE TO RELATED APPLICATION

This application claims priority under 35USC 119 from Japanese Patent Application No. 2002-187260, the disclosure of which is incorporated by reference herein.

BACKGROUND OF THE INVENTION

1. Field of the Invention

The present invention relates to a recording tape cartridge accommodating, within a case, a single reel on which is wound a recording tape, such as a magnetic tape or the like, which is used as a recording/playback medium mainly of computers or the like.

2. Description of the Related Art

Conventionally, magnetic tape cartridges have been known in which a magnetic tape, which is used as a data recording/playback medium of a computer or the like, is wound on a single reel, and the reel is accommodated in a case. A leader member, such as a leader pin, a leader tape, or a leader block, is provided at the distal end of the magnetic tape. A pull-out means provided at a drive device pulls the leader member out from an opening of the magnetic tape cartridge, and winds the magnetic tape, which is fixed to the leader member, onto a take-up reel of the drive device.

A reel gear is formed in an annular form in the center of the bottom surface of a reel which emerges from an open hole formed in the bottom surface of the magnetic tape cartridge. Due to a driving gear, which is provided at a rotating shaft of the drive device, meshing with this reel gear, the reel is driven to rotate. By rotating the reel of the magnetic tape cartridge and the take-up reel of the drive device synchronously, data can be recorded onto the magnetic tape, and data recorded on the magnetic tape can be played back.

Figure 7:
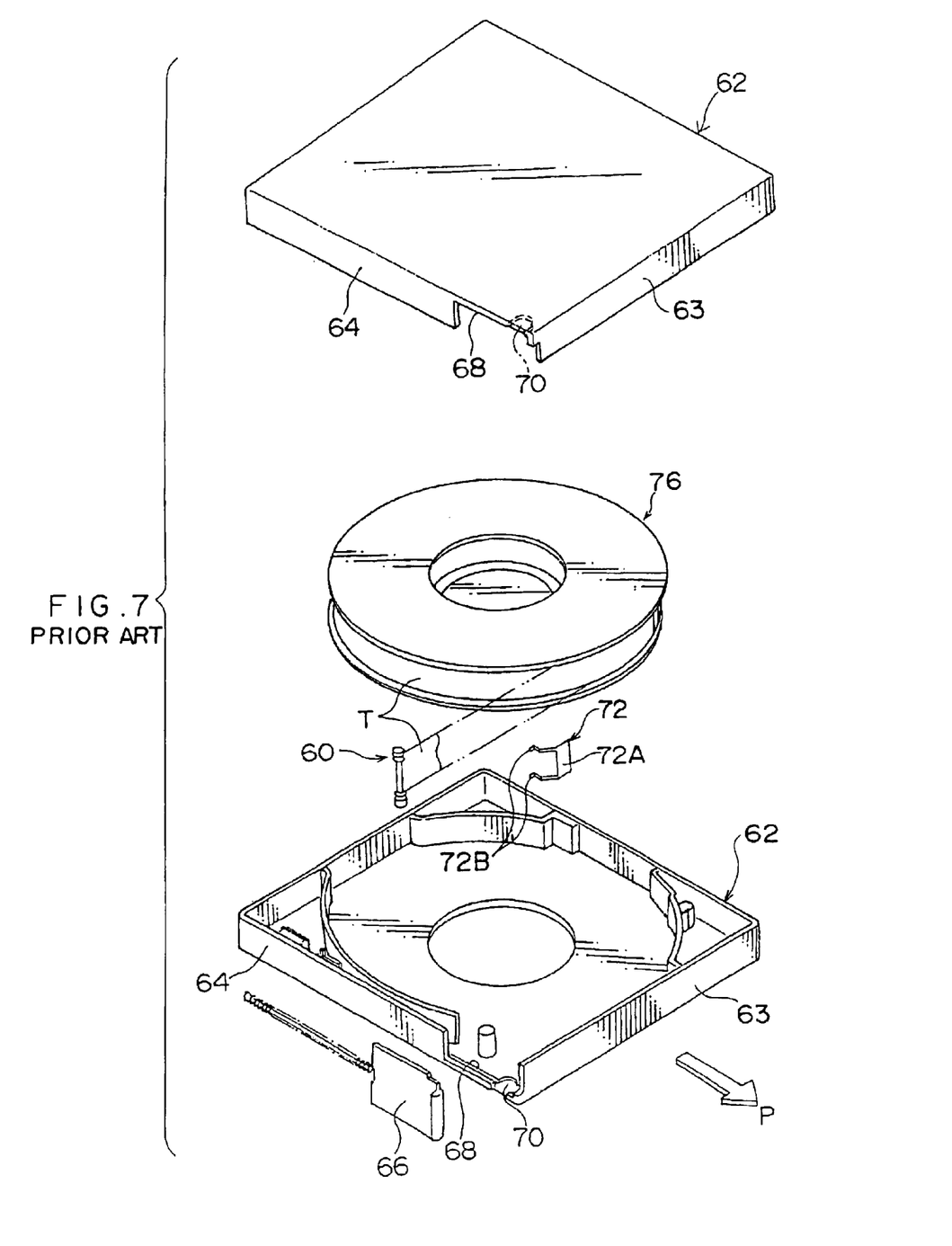
FIG. 7 is a schematic exploded perspective view of a conventional recording tape cartridge.

Such a magnetic tape cartridge requires little space for storage, and a large amount of information can be recorded thereon. The position of the opening and the type of the door which opens and closes the opening differ for each type of leader member. For example, in the case of a leader pin, as shown in FIG. 7, an opening 68 for pulling out of a leader pin 60 is formed in a side wall 64 of a case 62. The opening 68 is opened and closed by a door 66 which slides in the direction of loading the magnetic tape cartridge into a drive device (the direction of arrow P) and the direction opposite thereto.

Figure 8:
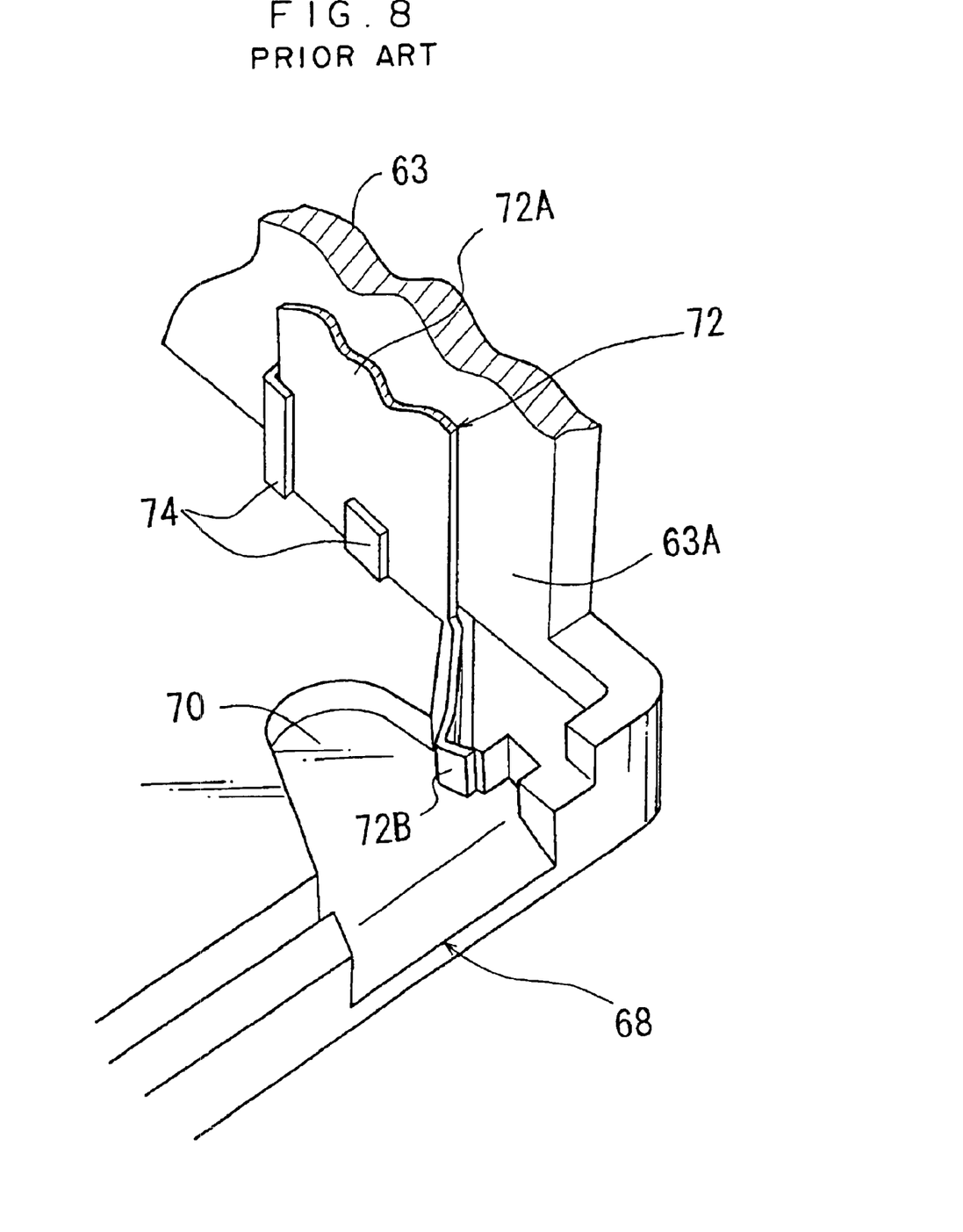
FIG. 8 is a schematic perspective view showing a state in a vicinity of an opening in the conventional recording tape cartridge of FIG. 7.

A pair of top and bottom pin holding portions 70, which hold the leader pin 60 when the magnetic tape cartridge is not being used (is being stored or the like) are provided at the inner side of the opening 68 of the case 62. As shown in FIG. 8, the pin holding portions 70 are concave portions which are substantially semicircular as seen in plan view, and respective one portions of the pin holding portions 70 are open so that the leader pin 60 can enter therein and exit therefrom. Both end portions of the leader pin 60, which is in a state of standing upright, are inserted into these concave portions (the pin holding portions 70). An anchor spring 72 is disposed in a vicinity of the pin holding portions 70 (the opening 68). Distal end portions (free end portions) 72B, which have been forked in two, of the anchor spring 72 push the upper and lower ends of the leader pin 60 toward the inner sides of the pin holding portions 70. In this way, the leader pin 60 does not fall out from the pin holding portions 70.

When the leader pin 60 enters into and exits from the pin holding portions 70, the distal end portions 72B of the anchor spring 72 elastically deform appropriately so as to permit movement of the leader pin 60. Conventionally, a proximal portion 72A of the anchor spring 72 is held by spring holding portions 74 in a state in which the proximal portion 72A closely contacts an inner surface 63A of a front wall 63 of the case 62 which front wall 63 faces in the direction of arrow P. Providing the anchor spring 72 in this state is preferable because it is easy to assemble the anchor spring 72 into the case 62, and the anchor spring 72 can be assembled stably.

However, because the opening 68 is formed at the end portion of the front wall 63 at which the anchor spring 72 is provided, this end portion is a free end and is a relatively weak portion. Even if an attempt is made to provide some type of reinforcing means thereat, it is difficult to ensure the space therefor because the reel 76 must be accommodated and the spring holding portions 74 must be provided.

SUMMARY OF THE INVENTION

An object of the present invention is to provide a recording tape cartridge in which it is possible to reinforce, in a small space, a side wall whose end portion is a free end due to the provision of an opening and which is weak in terms of strength.

In order to achieve the above-described object, in accordance with a first aspect of the present invention, there is provided a tape cartridge which can be inserted into a tape drive having an opening member, which can operatively engage with the tape cartridge at a time when the tape cartridge is inserted, and carrying out at least one of reading of data and writing of data, the tape cartridge comprising: a reel on which a tape is wound; a leader pin attached to a free end of the tape; a case which is hollow, which accommodates the reel, and which has a front wall portion facing in a cartridge insertion direction; a tape access opening provided at the case; a pin holding portion, provided in the case in a vicinity of the tape access opening, for holding the leader pin such that the leader pin can be freely released; an elastic member having a free end portion and a proximal portion, and anchoring the leader pin at the pin holding portion by pressing the leader pin by the free end portion; and a supporting portion provided in the case and having one or more anchor ribs and a plurality of holding ribs for reinforcing the front wall portion, the supporting portion supporting the proximal portion of the elastic member between the one or more anchor ribs and the holding ribs.

In accordance with another aspect of the present invention, there is provided a tape drive into which a tape cartridge can be inserted, and which carries out at least one of reading of data and writing of data, the tape cartridge having: a reel on which a tape is wound; a leader pin attached to a free end of the tape; a case which is hollow, which accommodates the reel, and which has a front wall portion facing in a cartridge insertion direction; a tape access opening provided at the case; a pin holding portion, provided in the case in a vicinity of the tape access opening, for holding the leader pin such that the leader pin can be freely released; an elastic member having a free end portion and a proximal portion, and anchoring the leader pin at the pin holding portion by pressing the leader pin by the free end portion; and a supporting portion provided in the case and having one or more anchor ribs and a plurality of holding ribs for reinforcing the front wall portion, the supporting portion supporting the proximal portion of the elastic member between the one or more anchor ribs and the holding ribs, wherein the tape drive has an opening member which can operatively engage with the tape cartridge at a time when the tape cartridge is inserted.

DESCRIPTION OF THE PREFERRED EMBODIMENTS

Hereinafter, a recording tape cartridge 10 relating to an embodiment of the present invention will be described on the basis of FIGS. 1 through 6. First, the overall structure of the recording tape cartridge 10 will be briefly described, and then, main portions relating to the present invention will be described in detail. Note that, for convenience of explanation, the direction of loading the recording tape cartridge 10 into a drive device is denoted by arrow A, and this direction of arrow A is the forward direction (front side) of the recording tape cartridge 10. The direction of arrow B, which is orthogonal to the direction of arrow A, is the rightward direction.

Figure 1:
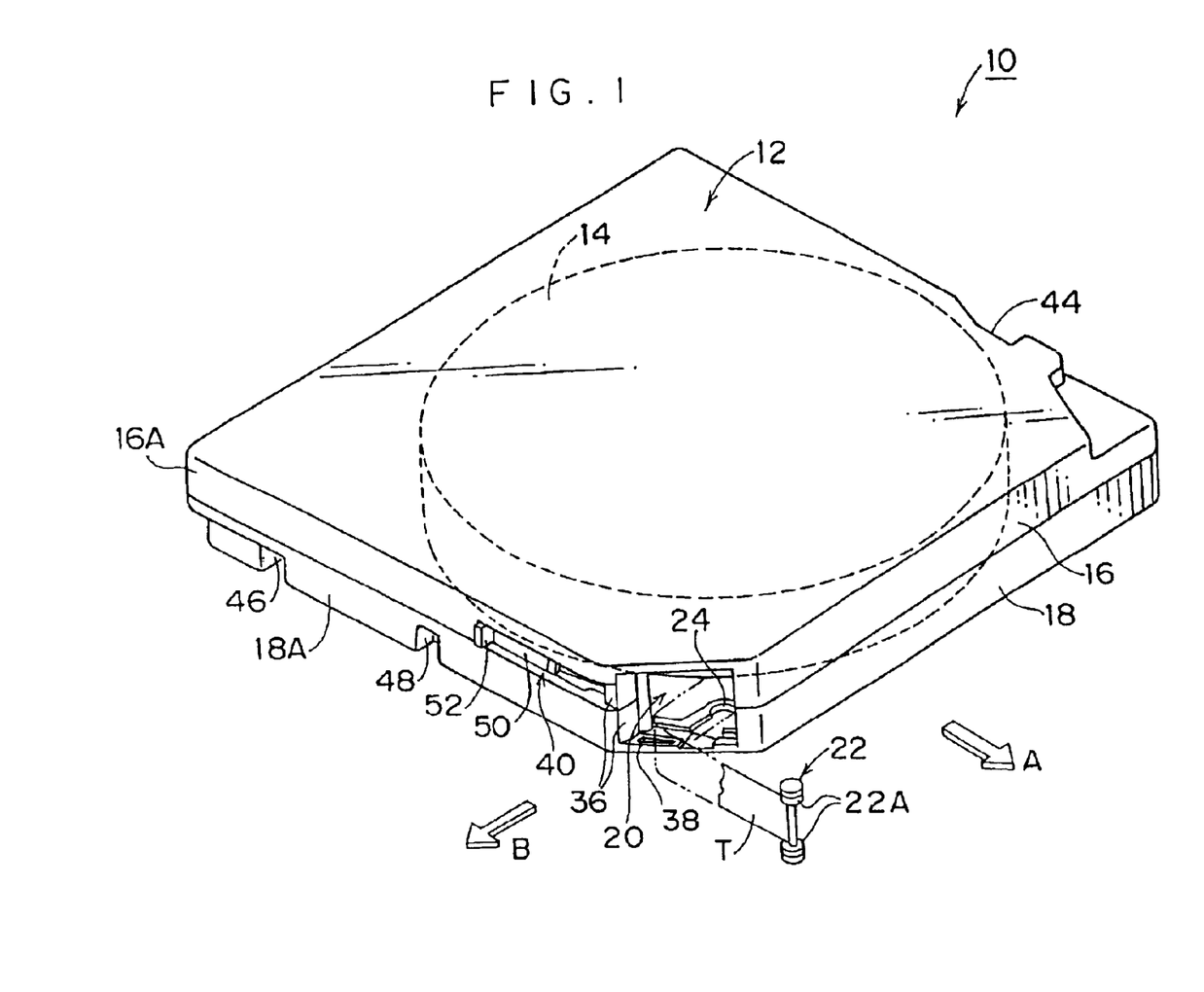
FIG. 1 is a schematic perspective view of a recording tape cartridge.
Figure 2:
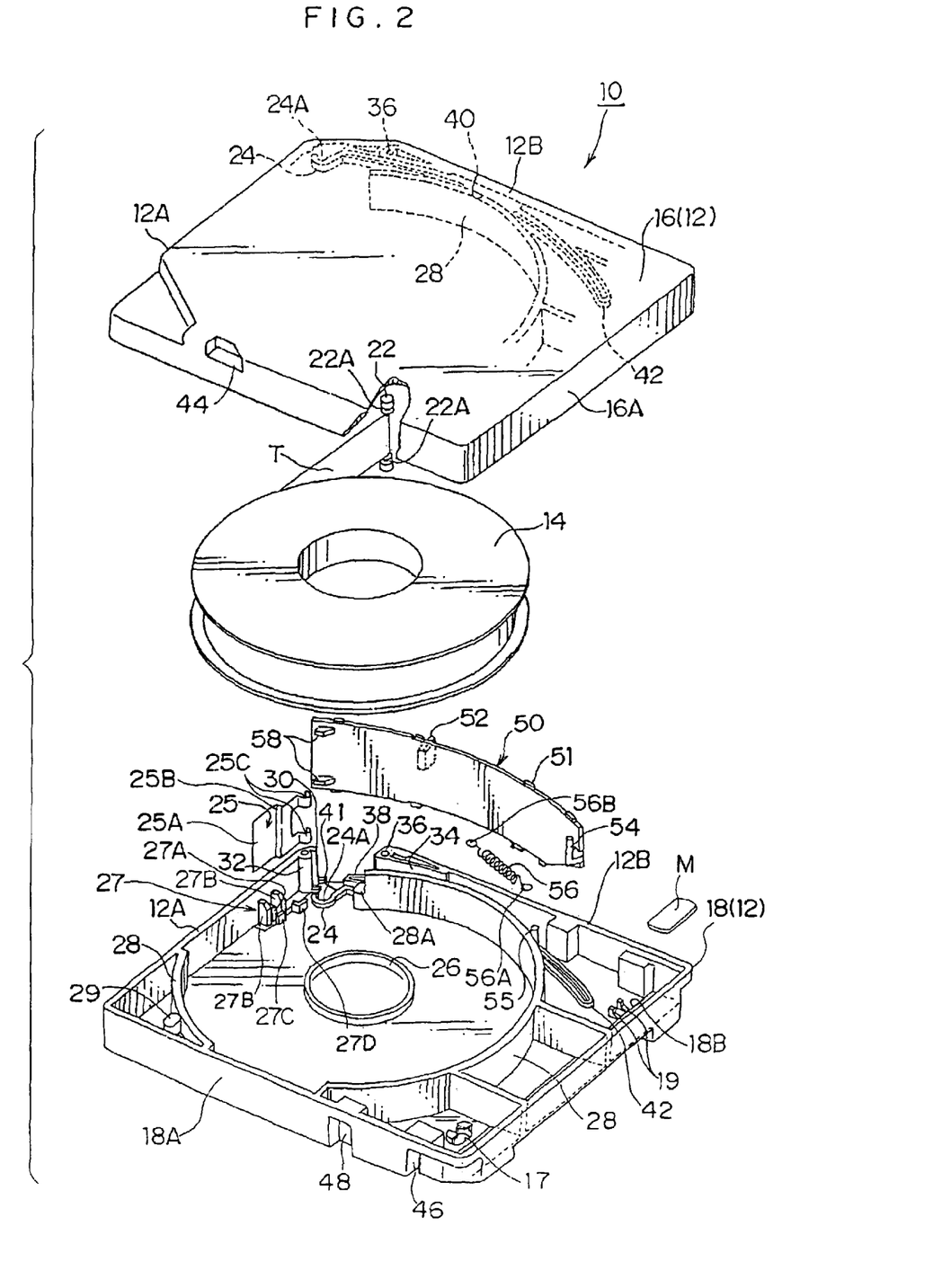
FIG. 2 is a schematic exploded perspective view of the recording tape cartridge.

As shown in FIGS. 1 and 2, the recording tape cartridge 10 is structured such that a single reel 14, on which is wound a magnetic tape T serving as a recording tape which is an information recording/playback medium, is rotatably accommodated within a case 12 which is substantially rectangular as seen in plan view. The case 12 is formed by joining together an upper case 16 and a lower case 18 with peripheral walls 16A, 18A thereof opposing each other. The front right corner portion of each of the upper case 16 and the lower case 18, which is one corner portion at the leading side in the direction of loading the recording tape cartridge 10 into a drive device, is cut off at an incline as seen in plan view. A space for accommodating the reel 14, on which the magnetic tape T is wound, is provided at the interior of the case 12.

Further, the corner portion of the upper case 16 and the lower case 18, at which corner portion the peripheral walls 16A, 18A have been cut off, forms an opening 20 which is for pulling-out of the magnetic tape T. A leader pin 22, which is pulled-out while being anchored (engaged) by a pull-out means of a drive device, is connected to the free end of the magnetic tape T which is pulled out from the opening 20. An annular groove 22A is formed in each of the end portions of the leader pin 22 which project out further than the transverse direction end portions of the magnetic tape T. The annular grooves 22A are anchored by hooks or the like of the pull-out means. In this way, the hooks or the like do not contact and scratch the magnetic tape T at the time of pulling-out the magnetic tape T.

Figure 3:
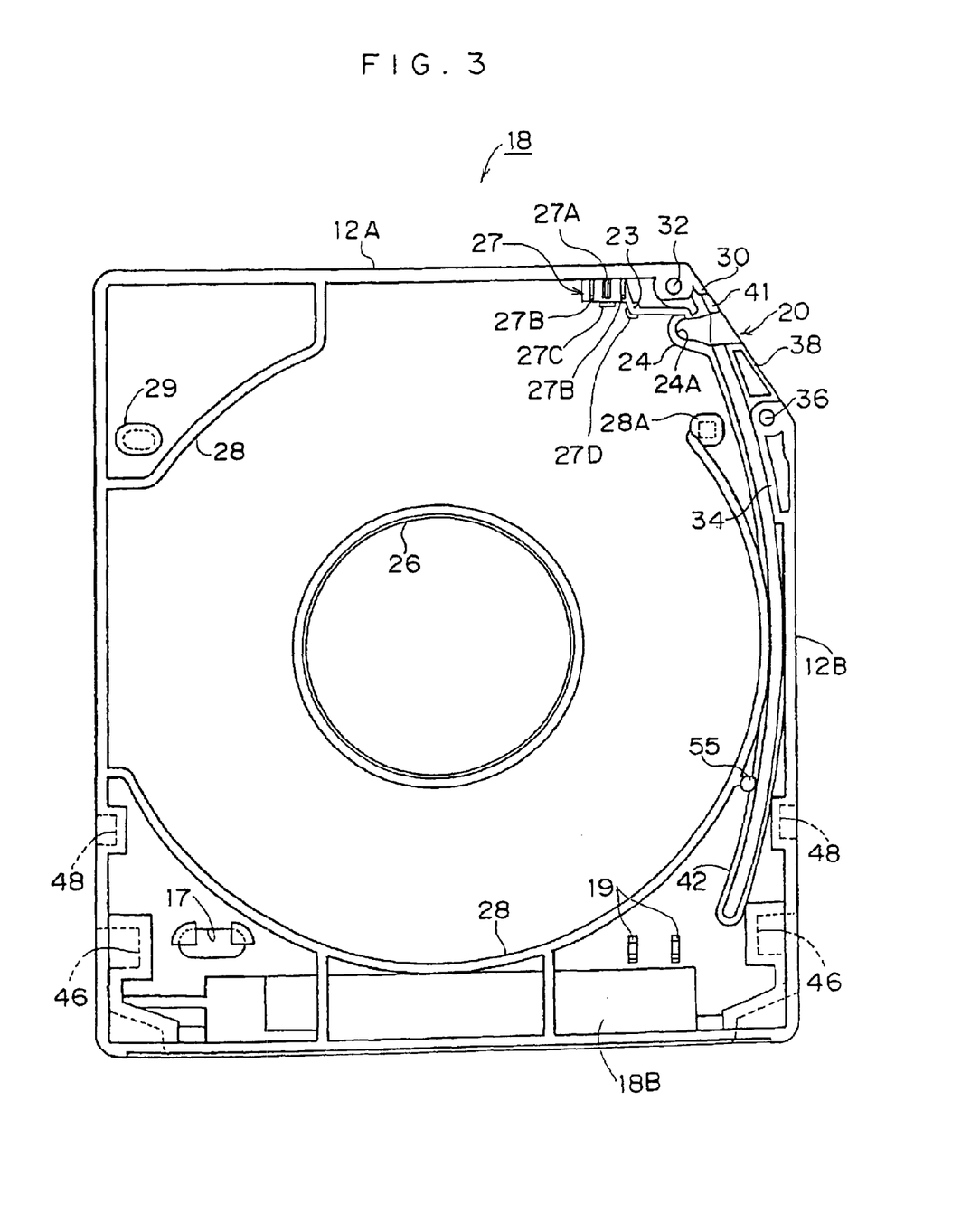
FIG. 3 is a schematic plan view of a lower case.

Further, a gear opening 26, which is for exposing an unillustrated reel gear of the reel 14 to the exterior, is formed in the central portion of the lower case 18. The reel 14 is driven to rotate within the case 12 by the reel gear meshing with a driving gear of a drive device. Further, the reel 14 is held so as to not joggle by play restricting walls 28 which project out at portions of the inner surfaces of the upper case 16 and the lower case 18, and which serve as inner walls which are on a circular locus which is coaxial with the gear opening 26.

Figure 4:
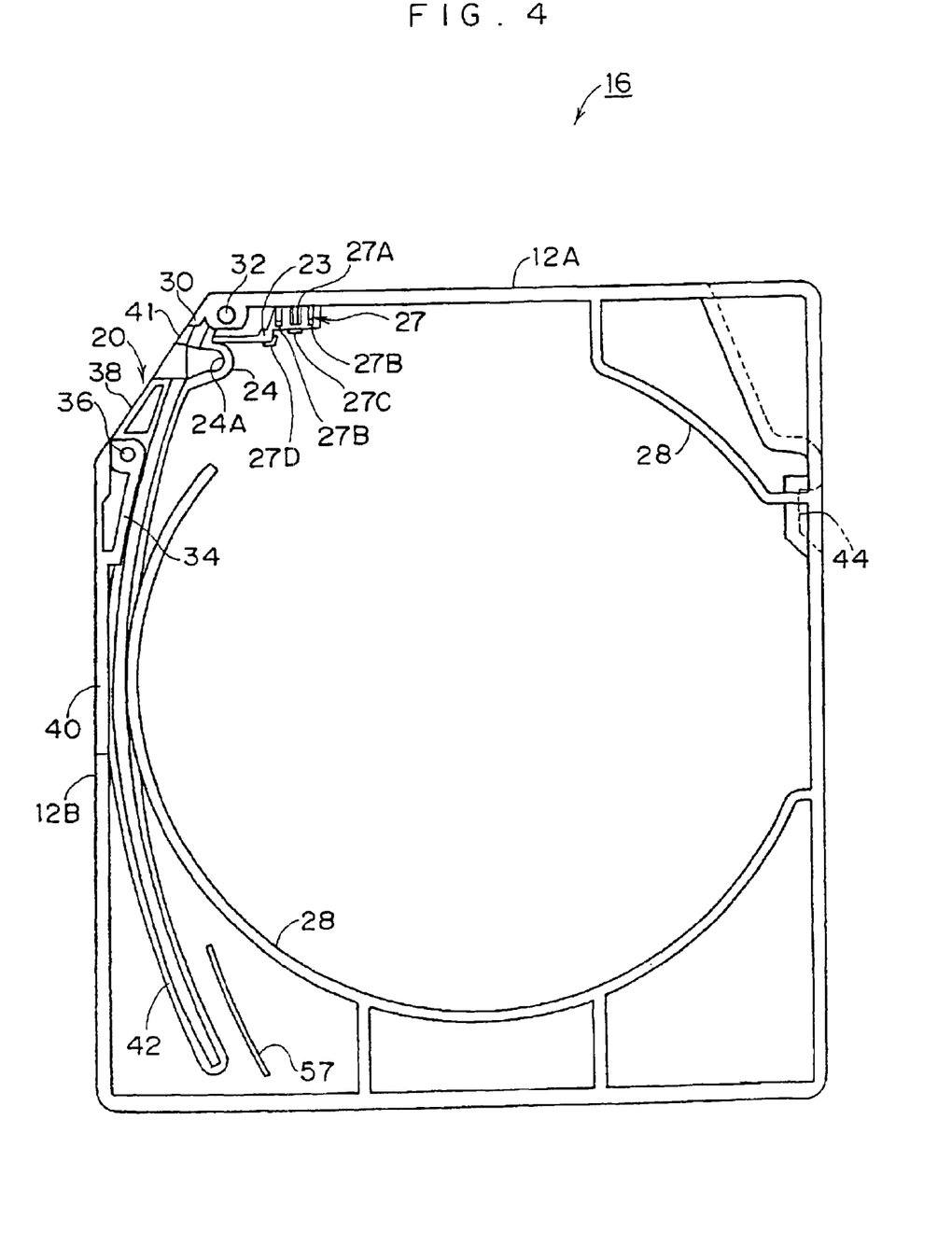
FIG. 4 is a schematic plan view of an upper case.

A bag portion 28A, in which a hole for position regulation is formed, is provided so as to be continuous with the end portion of the play restricting wall 28 in a vicinity of the opening 20. Further, a bag portion 29, in which a hole for position regulation which is a long hole, is provided so as to be set apart from the play restricting wall 28 at the inner side of the front left corner portion of the case 12. The bag portions 28A, 29 are disposed on a single straight line which extends along the direction of arrow B. The end portions of the play restricting walls 28, except for the end portion thereof at which the bag portion 28A is continuous, are continuous with the peripheral wall 16A or the peripheral wall 18A of the case 12, so as to partition the outer sides of the play restricting walls 28 and the space at which the reel 14 is set.

A memory board M, which stores various types of information, is set at the rear right portion of the lower case 18 for each recording tape cartridge 10. A rear portion inner wall 18B is formed at an inclined surface of a predetermined angle and the memory board M is supported by supporting projections 19 so as to be inclined at a predetermined angle, such that sensing is possible at a drive device which reads from the bottom surface side and at a library device (a device which accommodates a plurality of the recording tape cartridges 10 and which automatically loads and removes the recording tape cartridges 10 into and from drive devices) which reads from the rear wall side. Further, an unillustrated write protect portion, which is set so that recording onto the recording tape cartridge 10 is possible or is not possible, is provided at the left rear portion of the lower case 18. An open hole 17, through which projects an operating projection (not illustrated) which operates the write protect portion, is formed in the left rear portion of the lower case 18.

A pair of top and bottom inclined wall portions 30, which are short and which prescribe the front edge portion of the opening 20, are formed at the right end portion of a front wall 12A of the case 12. The inclined wall portions 30 are bent along the plane of opening of the opening 20. The inclined wall portions 30 serve as dustproofing walls such that no gap through which dust or the like can enter arises, due to the distal end of a door 50, which is substantially arc-shaped in plan view and which will be described later, entering in at the inner side of the inclined wall portions 30 when the opening 20 is closed. Further, a pair of upper and lower screw bosses 32 are continuous with the inner side of the front wall 12A in vicinities of the left sides of the inclined wall portions 30.

A pair of upper and lower inclined wall portions 34, which are shaped, in plan view, so as to substantially follow along the outer peripheral surface of the door 50, are provided at the inner side of the front end portion of a right wall 12B of the case 12. (The right wall 12B is the portions of the peripheral walls 16A, 18A where the outer surfaces thereof face in the direction of arrow B.) The front end surfaces of the inclined wall portions 34 prescribe the rear edge of the opening 20. A pair of upper and lower screw bosses 36 are provided at the front end portions of the inclined wall portions 34.

A slit 40, which is of a predetermined length and serves as a window portion which communicates the interior and the exterior of the case 12, is formed in the right wall 12B of the case 12. The slit 40 is for exposing an operation projection 52 of the door 50 which will be described later. The slit 40 is formed by cutting-out the lower portion of the front side of the peripheral wall 16A of the upper case 16 which forms the right wall 12B, and the slit 40 opens toward the opening 20 as well. Forming the slit 40 in this way such that a portion of the peripheral wall 16A remains at the upper side is preferable in that the rigidity of the case 12 can be maintained. In particular, it is more preferable that the upper side wall prescribing the slit 40 be integral and continuous with the inclined wall portion 34.

A concave portion 48 is formed at the rear side of the lower case 18. The portion of the concave portion 48, other than the upper end of the peripheral wall 18A, is recessed toward the inner side of the case 12 in a substantially U-shaped configuration as seen in cross-sectional view, and is recessed upwardly from the bottom surface of the case 12 as well (the floor plate is cut-out). The concave portion 48 is formed at the left wall of the case 12 as well. The concave portions 48 are engagement portions which, for example, a pull-in means of a drive device engages. The floor surfaces (the downwardly-facing surfaces) of the concave portions 48 serve as reference surfaces for positioning within a drive device.

Concave portions 46 are formed at the rear sides of the concave portions 48. The portion of the concave portion 46, other than the upper end of the peripheral wall 18A, is recessed toward the inner side of the case 12 in a substantially U-shaped configuration as seen in cross-sectional view, and is recessed upwardly from the bottom surface of the case 12 as well (the floor plate is cut-out). The concave portions 46 are engagement portions which a grasping means of a library device engages. By providing the concave portions 46, 48, the torsional strength of the case 12 (the lower case 18) is improved. Moreover, a concave portion 44, which is substantially trapezoidal as seen in plan view, is formed in the top surface portion of the left wall of the upper case 16. This concave portion 44 is an engagement portion which is engaged by a holding member (not shown) for canceling the rotational moment accompanying the movement of the door 50 in the direction of opening at the time of opening the opening 20.

Guide wall portions 42, which are predetermined heights (e.g., about 1.0 mm to 1.5 mm) and which support convex portions 51 of the door 50 (which will be described later) such that the convex portions 51 are nipped from both the inner surface side and the outer surface side, stand erect at the upper case 16 and the lower case 18 from a vicinity of the opening 20 to a vicinity of the region where the play restricting walls 28 are closest to the right wall 12B (hereinafter, these portions will be called the front half guide wall portions 42), and from a vicinity of the rear end of the slit 40 to a vicinity of the rear wall (hereinafter, these portions will be called the rear half guide wall portions 42).

The guide wall portions 42 are formed in substantial arc-shapes as seen in plan view, and have different lengths at the upper case 16 and the lower case 18. The guide wall portion 42 at the upper case 16 is formed such that the rear half side thereof is longer than that of the guide wall portion 42 at the lower case 18. This is because the memory board M is disposed so as to be inclined at a predetermined angle at the right wall 12B side of the rear portion inner wall 18B of the lower case 18.

Further, the rear end portions of the guide wall portions 42 are closed in substantial arc-shapes as seen in plan view, and restrict the convex portions 51 which are furthest toward the rear at both the top and bottom of the door 50 such that the door 50 cannot move any further rearward. The front end portions of the guide wall portions 42 extend to positions which, when the leader pin 22 is entering and exiting, do not impede the entry or exit of the leader pin 22 (in the illustrated structure, positions which are about half of the opening width of the opening 20 and which are further rearward than pin holding portions 24 which will be described later).

Guide wall portions 41, whose rear end portions are open, stand erect in vicinities of the inclined wall portions 30 so as to be positioned on imaginary lines extending from the guide wall portions 42. The rear end portions of the guide wall portions 41 do not extend further rearward than the front ends of the pin holding portions 24 (which will be described later), so as to not impede the entry and exit of the leader pin 22. The interval (groove width) of the guide wall portion 41 is formed so as to be slightly more narrow than the interval (groove width) of the guide wall portion 42.

Namely, the interval (groove width) of the guide wall portion 42 is slightly wider so as to permit dispersion in molding of the door 50 (dispersion in the curvature). The convex portions 51 of the door 50 slide within the guide wall portions 42 in a state in which there is a certain amount of joggling. Accordingly, the interval (groove width) of at least the guide wall portion 41 is substantially the same as the width of the convex portion 51 of the door 50 (the width including projections which will be described later). Due to the front most convex portions 51 being fit into the guide wall portions 41 when the opening 20 is closed, the door 50 can be held without joggling.

The guide wall portions 41 and the front half guide wall portions 42 are formed so as to be slightly lower than the rear half guide wall portions 42. Namely, for example, the heights of the guide wall portions 41 and the front half guide wall portions 42 are formed to be about 1 mm, whereas the heights of the rear half guide wall portions 42 are formed to be about 1.5 mm. This is in order to ensure, at the opening 20, space for entry of the pull-out means of a drive device which engages and pulls-out the leader pin 22. Accordingly, as will be described later, the plate width (height) of the front half portion of the door 50 (at least the portion thereof which closes the opening 20) is formed to be larger (higher) by an amount corresponding to the amount by which the guide wall portions 41 and the front half guide wall portions 42 are made lower.

Further, ribs 38, which are substantially trapezoidal in plan view and which are integral with the guide wall portions 42 at the outer sides which are exposed from the opening 20, stand erect at the inner surface of the upper case 16 and the inner surface of the lower case 18 so as to be the same heights as these guide wall portions 42. The strength of the upper case 16 and the lower case 18 at the opening 20 portion is ensured by these ribs 38.

The upper case 16 and the lower case 18 which were described above are fixed (joined) together by unillustrated screws being screwed, from beneath, into the screw bosses 32, 36 which are positioned in the vicinities of the edge portions of the opening 20. In this way, the corner portions at both ends of the opening 20, which are prescribed by the free ends of the inclined wall portions 30 (the front wall 12A) and the inclined wall portions 34 (the right wall 12B) and which are disadvantageous in terms of strength and which easily hit the ground or the like when the case 12 is dropped, are joined together strongly. Even if the case 12 is dropped, it is difficult for the case 12 to deform or buckle, or for positional offset to arise thereat, due to the entire weight of the recording tape cartridge 10. Note that the abutting surfaces of the peripheral walls 16A, 18A (the corner portions at both sides of the opening 20) may be fixed together by welding. However, fixing together by screws is preferable in consideration of the ability to disassemble and the ability to recycle the case 12.

The opening 20 is opened and closed by the door 50 which serves as a shielding member. The plate width (height) of the portion of the door 50 which slides in the guide wall portions 41 and the front half guide wall portions 42 (i.e., at least the portion of the door 50 which closes the opening 20) is formed to be substantially the same as the opening height of the opening 20. The portion at the rear side thereof is formed to be smaller (lower). The plate length of the door 50 is formed to be sufficiently larger than the opening width of the opening 20. The door 50 is formed in a substantial arc-shape as seen in plan view which curves along the direction of plate thickness, such that the door 50 can move along a predetermined circumference.

The curved longitudinal dimension of the door 50 is determined such that, in the state in which the door 50 closes the opening 20, the rear end portion of the door 50 is positioned in the right rear corner portion of the case 12, which is further toward the rear than the concave portion 48 (i.e., the right rear corner portion in a vicinity of the concave portion 46). The bottom rear portion of the door 50 is cut obliquely in order to avoid the memory board M which is disposed so as to be inclined at a predetermined angle at the rear portion inner wall 18B of the lower case 18. Note that the inner surface and/or the outer surface at the distal end portion (front end portion) of the door 50 is preferably formed as a tapered surface so as to smoothly enter into the guide wall portions 41. In the illustrated structure, a taper surface 50A is formed at the outer surface side.

The convex portions 51 project from the top surface and the bottom surface of the door 50. The convex portions 51 abut the guide surfaces of the guide wall portions 41 and the guide wall portions 42 (the inner surfaces which oppose each other) and the inner surface of the upper case 16 and the inner surface of the lower case 18 between the guide wall portions 41 and the guide wall portions 42, and guide the door 50 in the directions of opening and closing the opening 20. The convex portions 51 are formed in substantially oval shapes as seen in plan view which are long along the longitudinal direction of the door 50. Four convex portions 51 project at each of the top surface and the bottom surface of the door 50 so as to have top/bottom symmetry (except for the convex portions 51 furthest toward the rear), and so as to project to substantially the same heights as the heights of the guide wall portions 41 and the guide wall portions 42 (for example, about 0.5 mm at the front side of a border portion where the plate width of the door 50 changes, and about 1.5 mm at the rear side of this border portion). Note that the convex portions 51 furthest toward the rear do not have top/bottom symmetry because the bottom rear portion of the door 50 is cut obliquely.

The distal end of the convex portion 51 is formed in a substantial arc-shape as seen in sectional view (side view). Projections (not illustrated), which are substantially arc-shaped in plan view or are substantially triangular in plan view or the like, project along the entire height of the convex portion 51 at the both side surfaces of the convex portion 51. Accordingly, when the convex portions 51 are inserted between the guide wall portions 42 and slide, only the substantially arc-shaped distal ends of the convex portions 51 contact the inner surface of the upper case 16 and the inner surface of the lower case 18 such that linear contact arises thereat, and only the substantially arc-shaped (or the like) distal ends of the projections contact the mutually opposing guide surfaces of the guide wall portions 42 such that linear contact similarly arises thereat.

Thus, the sliding resistance (friction) between, on the one hand, the top and bottom convex portions 51, and, on the other hand, the inner surface of the upper case 16 and the inner surface of the lower case 18 between the guide wall portions 41 and the guide wall portions 42 and the guide surfaces of the guide wall portions 41 and the guide wall portions 42, can be reduced, and the door 50 can be slid smoothly with little resistance. Note that, when the convex portions 51 are formed in substantially oval shapes as seen in plan view, the impact resistance thereof is better than if, for example, the convex portions 51 were to be formed in substantially circular shapes as seen in plan view. Thus, even if force is applied to the door 50 from a direction other than the opening/closing directions due to the impact of a drop or the like, there is no fear that the convex portions 51 will break.

An operation projection 52 serving as an operation portion projects along the radial direction of the door 50 from the outer peripheral surface of the door 50 at a region which is slightly further forward than the longitudinal direction central portion of the door 50 (a vicinity of the border portion where the plate width of the door 50 changes). The operation projection 52 is exposed to the exterior of the case 12 from the slit 40. In the state in which the opening 20 is closed, the operation projection 52 is positioned so as to be slightly set apart from the rear end of the screw boss 36, and can be operated from the portion of the slit 40 which opens toward the front. Further, in the state in which the opening 20 is open, the operation projection 52 is positioned so as to be slightly set apart from the rear edge of the slit 40. At this time, the rear most convex portions 51 abut the rear end portions of the guide wall portions 42.

Although the interior and the exterior of the case 12 communicate via the slit 40 for exposing the operation projection 52, adhesion of dust and the like to the magnetic tape T wound on the reel 14 is prevented by the play restricting walls 28 serving as inner walls, and due to the fact that the slit 40 is always substantially closed by the screw boss 36 and by the door 50 which extends over substantially the entire height in the case 12.

Further, stoppers 58, which abut the upper end portion side surface and the lower end portion side surface of the leader pin 22 when the opening 20 is closed, project at the inner surface of the front end portion of the door 50. The stoppers 58 can even further prevent the leader pin 22 from falling out from the pin holding portions 24 (which will be described later) due to impact of a drop or the like. Further, a coil spring 56, which serves as an urging member which urges the door 50 in the direction of closing the opening 20, has a length such that it extends to the rear right corner portion of the case 12 in the state in which the door 50 closes the opening 20. Thus, the space between the play restricting walls 28 and the right wall 12B (the peripheral walls 16A, 18A) at the rear right corner portion can be utilized effectively.

Namely, a spring holding portion 54, which is substantially L-shaped in rear view, projects integrally at the inner peripheral surface of the door 50 in the vicinity of the rear end thereof, so as to be directed upwardly. A solid cylindrical spring anchor portion 55 projects upwardly at the inner surface of the lower case 18 in a vicinity of the concave portion 48. Ring-shaped attachment portions 56A, 56B are formed at the both ends of the coil spring 56. Accordingly, the one attachment portion 56B of the coil spring 56 is placed on the spring anchor portion 55 from above such that the spring anchor portion 55 is inserted through the attachment portion 56B, and the other attachment portion 56A is placed on the spring holding portion 54 from above such that the spring holding portion 54 is inserted through the attachment portion 56A. The coil spring 56 can thereby be attached simply within the aforementioned space.

A rib 57, which the top end of the spring holding portion 54 slidingly contacts at the time when the door 50 is opening and closing, stands erect in a substantial arc-shape in plan view at the upper case 16. The rib 57 is disposed at a position and has a length such that the top end of the spring holding portion 54 can slidingly contact the rib 57 at least when the door 50 starts to move (open). Due to the rib 57 suitably guiding the spring holding portion 54 which moves against the urging force of the coil spring 56, the door 50 can be opened more stably (i.e., at the time of opening, the door 50 does not shake due to the urging force of the coil spring 56).

Further, by providing the rib 57, even if the attachment portion 56A of the coil spring 56 rises up along the spring holding portion 54 due to an impact caused by a drop or the like being applied to the case 12, the attachment portion 56A does not come off of the spring holding portion 54. Note that the top end of the spring anchor portion 55 is inserted between the play restricting wall 28 and the guide wall portion 42 of the upper case 16. Thus, in the same way, the attachment portion 56B can be prevented from coming off of the spring anchor portion 55.

Next, the pin holding portions 24, an anchor spring 25, and spring holding portions 27 relating to the present invention will be described. The pair of upper and lower pin holding portions 24, which position and hold the leader pin 22 at the interior of the case 12, are provided at the inner side of the opening 20 of the case 12. As shown in FIGS. 3 through 6, the pin holding portions 24 are formed in substantially semicylindrical shapes whose magnetic tape T pull-out sides are open. The end portions of the leader pin 22, which is in a state of standing upright, are held in the pin holding portions 24 so as to be able to enter into and exit from concave portions 24A of the pin holding portions 24 from the open sides thereof. Note that the pin holding portions 24 are integral and continuous with the inner side guide wall portions 42. It is preferable that the heights of the pin holding portions 24 are substantially the same as or greater than the heights of the guide wall portions 42 with which they are integral and continuous.

The plate thickness of the area at which the pin holding portions 24 are set is relatively thick (e.g., 2 mm) at both the upper case 16 and the lower case 18. This is in order to increase the strength in the vicinity of the pin holding portions 24 which is the held (positioned) position of the leader pin 22 which is most important to the functioning of the recording tape cartridge 10 (in order for the leader pin 22 to be correctly anchored by the pull-out means at the time when the magnetic tape T is pulled-out), and is in order for positional offset of the leader pin 22 to not arise due to the impact caused by the case 12 (the recording tape cartridge 10) being dropped or the like. Note that, when the positions at which the pin holding portions 24 are set are positioned close to the screw bosses 32 as in the illustrated structure, positional offset of the leader pin 22 due to vibrations of the ceiling plate and the floor plate accompanying a drop of the case 12 or the like can be prevented even more.

Figure 6:
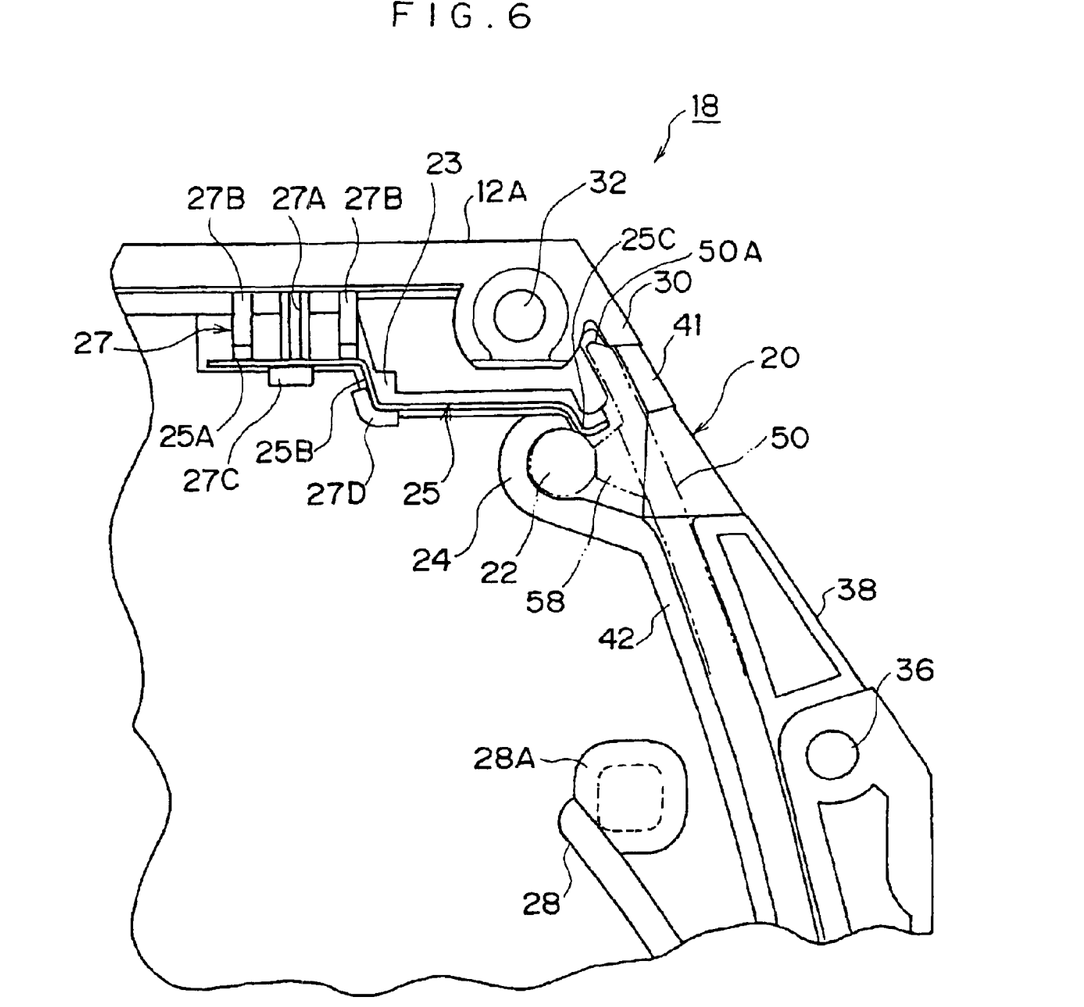
FIG. 6 is a schematic plan view showing the state in the vicinity of the opening.

The anchor spring 25, which presses the leader pin 22 such that the leader pin 22 does not fall out from the pin holding portions 24, is fixed in a vicinity of the pin holding portions 24 (the opening 20). The anchor spring 25 is shaped as a plate spring which is formed by bending a metal plate. As shown in FIGS. 2 and 6, the anchor spring 25 has a proximal portion 25A which is held at the spring holding portions 27, a central portion 25B which is bent at about 90° and extends from the proximal portion 25A, and operation portions 25C which have been forked in two and are bent at about 90° from the central portion 25B and extend parallel to the proximal portion 25A.

The distal ends (free ends) of the operation portions 25C are formed in substantial arc-shapes as seen in plan view. The curved surfaces thereof abut the upper and lower ends of the leader pin 22. Due to the distal ends of the operation portions 25C pushing the upper and lower ends of the leader pin 22 toward the inner sides of the concave portions 24A of the pin holding portions 24, the leader pin 22 is held in the pin holding portions 24. Note that, when the leader pin 22 enters into and exits from the pin holding portions 24, the operation portions 25C of the anchor spring 25 elastically deform appropriately so as to permit movement of the leader pin 22.

Figure 5:
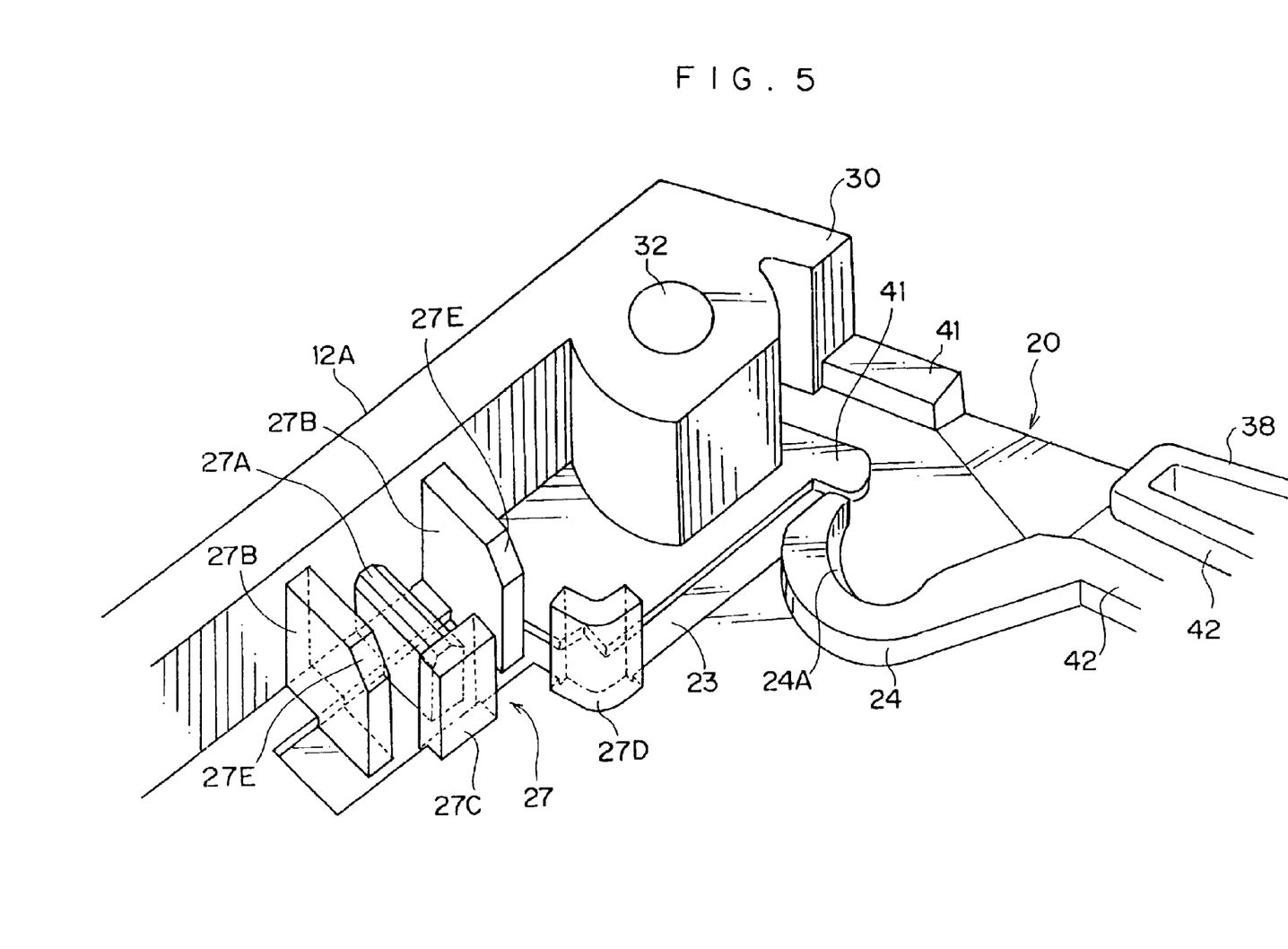
FIG. 5 is a schematic perspective view showing a state in a vicinity of an opening.

The upper and lower side edge portions of the anchor spring 25 are inserted in groove portions 23 which are provided at the inner surface of the case 12 in a vicinity of the front wall 12A and the opening 20, and are held thereat by the pair of upper and lower spring holding portions 27. (The front wall 12A is the portions of the peripheral walls 16A, 18A where the outer surfaces face in the direction of arrow A.) As shown in FIGS. 5 and 6, the spring holding portion 27 has a holding rib 27A and holding ribs 27B. The holding rib 27A is flat-plate-shaped and juts out from the inner surface of the front wall 12A, i.e., projects integrally with and perpendicularly to the inner surface of the front wall 12A and the inner surface of the case 12. The holding ribs 27B are flat-plate-shaped and project similarly, and are disposed at the left and right sides of the holding rib 27A so as to be separated from the holding rib 27A by a predetermined interval. The spring holding portion 27 also has an anchor rib 27C and a supporting rib 27D. The anchor rib 27C is flat-plate-shaped and projects parallel to the front wall 12A so as to oppose the holding rib 27A with a predetermined interval therebetween (an interval which is substantially the same as the thickness of the anchor spring 25). The supporting rib 27D is shaped as a curved plate and curves in a substantial arc-shape as seen in plan view, and supports the border portion between the central portion 25B and the operation portions 25C.

Accordingly, the proximal portion 25A is supported by being fit into the gap between the rear end surface of the holding rib 27A and the anchor rib 27C and also contacting the rear end surfaces of the holding ribs 27B. The border portion between the central portion 25B and the operation portions 25C is supported by the supporting rib 27D. In this way, the anchor spring 25 is held in a state in which the proximal portion 25A is separated from the inner surface of the front wall 12A by a distance corresponding to the lengths of the holding ribs 27A, 27B. In this way, the flat-plate-shaped holding ribs 27A, 27B project integrally with and perpendicularly to the inner surface side of the front wall 12A at whose end portion (the right end portion in this case) the opening 20 is formed. Thus, the strength of the front wall 12A can be reinforced by the holding ribs 27A, 27B, and deformation, breakage and the like of the front wall 12A due to the impact of a drop can be suppressed.

Moreover, because the spring holding portion 27 also serves as a reinforcing member which reinforces the front wall 12A, there is no need to separately provide a member for reinforcing the front wall 12A within the case 12. The space within the case 12 can be utilized effectively, and space can be conserved. Note that it is preferable to form a taper surface 27E at the rear end surface corner portion of the holding rib 27B which contacts the anchor spring 25, in order to facilitate insertion (fitting-in) of the anchor spring 25. Moreover, although the height of the holding rib 27A is formed to be lower than the heights of the holding ribs 27B, the configurations of the holding rib 27A and the like are not limited to those of the illustrated structure. In addition, the configuration, the position, and the like of the anchor rib 27C are not limited to those of the illustrated structure. Provided that the anchor spring 25 can be held at the rear end surface sides of the holding ribs 27A, 27B, any type of structure may be used.

Moreover, the configuration and the depth of the groove portions 23 are not limited to those of the illustrated structure. It suffices for the groove portions 23 to be formed in a recessed manner to sizes and depths of an extent that the upper and lower side edge portions of the anchor spring 25, whose proximal portion 25A is fit-in in the gap between the holding rib 27A and the anchor rib 27C, can be inserted by a predetermined length, and that the strength of the case 12 itself does not deteriorate. However, because the operation portions 25C elastically deform appropriately at the time when the leader pin 22 enters and exits, the width of the groove portions 23 at which the operation portions 25C are inserted must be formed to a width which sufficiently allows such elastic deformation.

Next, operation of the present embodiment will be described. When the recording tape cartridge 10 having the above-described structure is not being used (i.e., is being stored, is being transported, or the like), the opening 20 is closed by the door 50. Specifically, due to the urging force of the coil spring 56, the door 50 is always urged in the direction of closing the opening 20, and closes the opening 20 in a state in which the distal end portion (front end portion) of the door 50 has entered in the guide wall portions 41 which are in a vicinity of the inclined wall portions 30.

On the other hand, when the magnetic tape T is to be used, the recording tape cartridge 10 is loaded into a drive device along the direction of arrow A. Accompanying this loading, an opening/closing member forming an opening/closing means of the drive device enters into the slit 40 which opens toward the front, and engages with the operation projection 52 of the door 50. In this state, when the recording tape cartridge 10 (the case 12) is pushed in further, due to the pushing-in force, the opening/closing member moves the operation projection 52 rearward against the urging force of the coil spring 56 (i.e., moves the operation projection 52 rearward relative to the case 12 which is loaded in the direction of arrow A). The opening/closing member extends in a direction traversing the direction of insertion of the cartridge.

Then, while the convex portions 51 are guided by the guide wall portions 42 and the spring holding portion 54 is guided by the rib 57, the door 50, from which the operation projection 52 projects, rotates clockwise as seen in plan view along the direction of curving thereof. Namely, due to the guide wall portions 42, the door 50 moves substantially rearward so as to circle around the outer sides of the pin holding portions 24 and the reel 14 without jutting out from the locus of movement along the curved configuration of the door 50, and opens the opening 20. Then, when the case 12 (the recording tape cartridge 10) is loaded to a predetermined depth in the drive device, the opening 20 is completely opened.

When the recording tape cartridge 10 is positioned within the drive device in this state in which the opening 20 is opened, further rotation (substantially rearward movement) of the door 50 is restricted. The pull-out means of the drive device enters into the case 12 from the opening 20 which has been opened. The pull-out means pulls-out the leader pin 22 which is positioned and held at the pin holding portions 24. At this time, the operation portions 25C of the anchor spring 25 elastically deform appropriately, such that pulling-out of the leader pin 22 from the pin holding portions 24 is permitted. Then, the leader pin 22 is accommodated at a take-up reel (not shown), and the take-up reel and the reel 14 are driven to rotate synchronously. Thus, the magnetic tape T is successively pulled-out from the case 12 while being taken-up onto the take-up reel. Information is recorded or played back by a recording/playback head or the like disposed along a predetermined tape path.

On the other hand, when the magnetic tape T is rewound onto the reel 14 and the leader pin 22 is to be held at the pin holding portions 24, the operation portions 25C of the anchor spring 25 elastically deform appropriately such that entry of the leader pin 22 into the pin holding portions 24 is permitted. When the recording tape cartridge 10 is to be ejected from the drive device, the positioned state of the recording tape cartridge 10 is cancelled, and the recording tape cartridge 10 is moved in the direction opposite to the direction of arrow A by the urging force of the coil spring 56 or by an unillustrated ejecting mechanism. In this way, the door 50 is rotated in the direction of closing the opening 20 by the urging force of the coil spring 56, while the convex portions 51 are guided by the guide wall portions 42. Due to the distal end portion (front end portion) of the door 50 entering into the guide wall portions 41, the opening 20 is completely closed and returned to its initial state.

Here, the spring holding portions 27 which hold the anchor spring 25 have the holding ribs 27A, 27B which project perpendicularly to the front wall 12A. Thus, the strength of the front wall 12A, at whose end portion the opening 20 is formed and which is weak in terms of strength, can be increased. The strength of the front wall 12A is also increased by upper case 16 and the lower case 18 being screwed together at the screw bosses 32. It is thereby possible to suppress plastic deformation, breakage and the like of the front wall 12A due to the impact of a drop. Moreover, because the holding ribs 27A, 27B of the spring holding portions 27 also function as reinforcing members which reinforce the front wall 12A, there is no need to provide a separate reinforcing member. The space within the case 12 can be utilized effectively, and space can be conserved.

As described above, in accordance with the present invention, the side wall of a case can be reinforced by spring holding portions of an anchor spring which pushes a leader pin. Thus, deformation and breakage of this portion due to the impact of a drop can be suppressed. Moreover, because the spring holding portions also function as reinforcing members which reinforce the side wall, there is no need to provide a separate member for reinforcing the side wall. The space within the case can be utilized effectively, and space can be conserved.

What is claimed is:

1. A tape cartridge which can be inserted into a tape drive having an opening member, which can operatively engage with the tape cartridge at a time when the tape cartridge is inserted, and carrying out at least one of reading of data and writing of data, the tape cartridge comprising:

a reel on which a tape is wound;

a leader pin attached to a free end of the tape;

a case which is hollow, which accommodates the reel, and which has a front wall portion facing in a cartridge insertion direction;

a tape access opening provided at the case;

a pin holding portion, provided in the case in a vicinity of the tape access opening, for holding the leader pin such that the leader pin can be freely released;

an elastic member having a free end portion and a proximal portion, and anchoring the leader pin at the pin holding portion by pressing the leader pin by the free end portion;

a supporting portion provided in the case and having one or more anchor ribs and a plurality of holding ribs for reinforcing the front wall portion, the supporting portion supporting the proximal portion of the elastic member between the one or more anchor ribs and the holding ribs; and a shielding member which can move reciprocatingly along an arc-shaped path of movement between a closing position for closing the tape access opening and an opening position for opening the tape access opening.

2. The tape cartridge of claim 1, wherein the case has a side wall portion which is substantially parallel to the cartridge insertion direction, and an inclined wall portion which is connected to the front wall portion and the side wall portion and is inclined with respect to the cartridge insertion direction, and the tape access opening is provided at the inclined wall portion of the case.

3. The tape cartridge of claim 1, wherein the holding ribs are formed integrally with the front wall portion.

4. The tape cartridge of claim 1, wherein the holding ribs project from an inner surface of the front wall portion toward an interior of the case.

5. The tape cartridge of claim 1, wherein the elastic member is a plate spring.

6. The tape cartridge of claim 1, further comprising an urging element which always urges the shielding member toward the closing position.

7. The tape cartridge of claim 1, further comprising an operation portion provided at the shielding member, and due to the tape cartridge being inserted, the operation portion can move the shielding member toward the opening position while engaging with the opening member of the tape drive.

8. The tape cartridge of claim 1, wherein the case is substantially rectangular in plan view.

9. The tape cartridge of claim 1, wherein the case is formed from an upper case and a lower case; and a plurality of joining portions for joining the upper case and the lower case are provided.

10. The tape cartridge according to claim 1, wherein said anchor rib and said plurality of holding ribs are flat and plate-shaped and wherein said plurality of holding ribs are integral with and project perpendicularly to the inner surface of the front wall and inner surface of the case.

11. A tape drive into which a tape cartridge can be inserted, and which carries out at least one of reading of data and writing of data, the tape cartridge having:

a reel on which a tape is wound;

a leader pin attached to a free end of the tape;

a case which is hollow, which accommodates the reel, and which has a front wall portion facing in a cartridge insertion direction;

a tape access opening provided at the case;

a pin holding portion, provided in the case in a vicinity of the tape access opening, for holding the leader pin such that the leader pin can be freely released;

an elastic member having a free end portion and a proximal portion, and anchoring the leader pin at the pin holding portion by pressing the leader pin by the free end portion;

a supporting portion provided in the case and having one or more anchor ribs and a plurality of holding ribs for reinforcing the front wall portion, the supporting portion supporting the proximal portion of the elastic member between the one or more anchor ribs and the holding ribs; and a shielding member which can move reciprocatingly along an arc-shaped path of movement between a closing position for closing the tape access opening and an opening position for opening the tape access opening, wherein the tape drive has an opening member which can operatively engage with the tape cartridge at a time when the tape cartridge is inserted.

12. The tape drive of claim 11, wherein, at the time when the tape cartridge is inserted, the opening member engages with the shielding member and can move the shielding member toward an opening position.

13. The tape drive of claim 11, wherein the opening member projects in a direction traversing the tape cartridge insertion direction.

14. The tape drive of claim 11, wherein the opening member enters into the case at the time when the tape cartridge is inserted.

15. The tape drive of claim 14, wherein the opening member enters in from a slit provided at the case.

16. The tape cartridge according to claim 1, further comprising a groove portion provided at an inner surface of the case in a vicinity of the front wall and the opening, wherein said groove portion holds the elastic member.

17. The tape cartridge according to claim 1, further comprising a supporting rib wherein said supporting rib is a curved plate curving in a substantial arc-shape and supports a portion of the elastic member between the free end portion and the proximal portion.

18. The tape drive according to claim 11, further comprising a groove portion provided at an inner surface of the case in a vicinity of the front wall and the opening, wherein said groove portion holds the elastic member.

19. The tape drive according to claim 11, further comprising a supporting rib wherein said supporting rib is a curved plate curving in a substantial arc-shape and supports a portion of the elastic member between the free end portion and the proximal portion.

20. The tape drive according to claim 11, wherein said anchor rib and said plurality of holding ribs are flat and plate-shaped and wherein said plurality of holding ribs are integral with and project perpendicularly to the inner surface of the front wall and inner surface of the case.

* * * * *